United States Patent

[11] 3,578,164

| [72] | Inventors | Jonas Weiss |
| | | Plainfield; |
| | | William Hodes, Edison, N.J. |
| [21] | Appl. No. | 728,937 |
| [22] | Filed | May 14, 1968 |
| [45] | Patented | May 11, 1971 |
| [73] | Assignee | American Standard Inc. |
| | | New York, N.Y. |

[54] WATER SOFTENING CONTROL
4 Claims, 6 Drawing Figs.

[52] U.S. Cl. ...................................................... 210/96,
210/500
[51] Int. Cl. ....................................................B01d 15/04,
B01d 19/06
[50] Field of Search............................................ 210/96,
141, 499, 500

[56] References Cited
UNITED STATES PATENTS
3,062,379  11/1962  Bryan............................ 210/499
3,250,392  5/1966  Luck ............................ 210/96

*Primary Examiner*—John Adee
*Attorneys*—Sheldon H. Parker, Tennes I. Erstad and Robert G. Crooks ABSTRACT: In a water-treating apparatus comprising in combination cation-exchange means for removing divalent cations from water to be treated and substituting for the divalent cations, cations selected from the group consisting of hydrogen ions and sodium ions, anion-exchange means for removing divalent anions from the water and substituting for the anions, anions selected from the group consisting of hydroxyl ions and chloride ions, sensing means consisting of a contractile fiber having a length dependent on the concentration of calcium ions in the water and located in the apparatus in the flow stream of the water at a point downstream of at least a portion of the cation-exchange means, the sensing means being sensitive to the concentration of calcium ions in the water, means for regenerating the cation-exchange means and the anion-exchange means, and means responsive to the sensing means for activating the regenerating means in response to a predetermined level of calcium ion concentration in the water, the improvement in the water-treating apparatus comprising as the sensing means a water insoluble contractile fiber composed of polymers containing nonhydrolyzable groups which groups are selected from the group consisting of carboxy, primary, secondary and tertiary amines and imine.

Patented May 11, 1971 3,578,164

INVENTORS
JONAS WEISS
WILLIAM HODES
BY
Sheldon H Parker
Attorney

WATER SOFTENING CONTROL

This invention relates to improved water softening control. In particular, this invention relates to water softening or deionization by the use of polymers which contain groups that react with ions which cause water hardness. In a more particular aspect, this invention relates to the use of such polymers to detect the buildup of these ions and allow for the automatic starting of a regeneration cycle in a water softener at a predetermined concentration.

It is a common practice in the water treatment art to purify water by passing it through beds or columns filled with ion-exchange materials. Typically, in industrial practice, at least two columns are used, or two sections of a single column, to provide at least two treatment sections. In one of these sections, a cation-exchange material is used as the column packing. Such a cation-exchange material may be, for example, a resinous composition having fixed anions in combination with exchangeable cations, which may be, for example, hydrogen or sodium ions. As the water percolates through the bed of cation-exchange resin, those cations in the water that are responsible for making it hard are exchanged for the exchangeable ions of the resin, so that the treated water emerging from the cation-exchange column contains acids or sodium salts in place of the calcium, magnesium and other salts originally present in the water.

Following treatment by the cation-exchange resin, the water is usually passed through a second column or zone in which it is subjected to the action of an anion-exchange resin. The anion-exchange resin may be, for example, a resinous composition having fixed cations in combination with an exchangeable anion, usually chloride or hydroxyl ion. As the water discharged from the cation-exchange column is percolated through the anion-exchange column, the anions corresponding to the acids or sodium salts therein are exchanged for the exchangeable anion in the anion-exchange resin.

Normally, when the exchangeable ion in the cation-exchange resin used is hydrogen ion, the anion exchange resin used is one in which the exchangeable ion is the hydroxyl ion. In this case, the metal salts are converted in the cation-exchange column to the corresponding acids, and the acids are converted in the anion-exchange column to water. The product of such a purification system is known as "de-ionized" or "de-mineralized" water.

When the exchangeable ion in the cation-exchange column is sodium, it is usual to use an anion-exchange column packed with a resin in which the exchangeable ion is chloride. In such a system, the cation-exchange column converts salts of other cations (calcium, magnesium, etc.) to the corresponding sodium salts, and the anion-exchange column converts the sodium salts (sodium carbonate, sulfate, etc.) to sodium chloride. The product of such a system is known as "softened" water. Softened water, unlike de-ionized water, has a mineral content in the form of sodium chloride. Water softening systems, as opposed to de-ionization systems have the advantage, however, that both the cation and the anion-exchange resins can be regenerated with brine solution, whereas de-ionization systems require the use of two different solutions, both of which are more expensive than brine—for example a solution of strong acid, such as $H_2SO_4$ or $HCl$, to regenerate the ion-exchange resin, and a solution of a strong base such as $NaOH$ to regenerate the anion-exchange resin.

The present invention is equally applicable to de-ionization systems and to softening systems. It is herein described, as a matter of convenience, primarily with respect to water softening systems.

In either de-ionization systems or in water softening systems as above described, it is in the nature of the process that the cation and anion exchange resins eventually lose their effective exchange capacity by virtue of the fact that all or a substantial part of the exchangeable ions have been replaced by ions removed from the water being treated. Thus, the available sodium ions in the cation-exchange resin of a water softening system are eventually replaced to a large extent by calcium, magnesium and other ions extracted from the water, and the available chloride ions have been largely replaced by carbonate, sulfate, and other anions from the water. When this condition is reached, the exchange resins are no longer effective to remove the undesired ions from the water, and the resins must be regenerated. In the case of water softening systems as above described, this is done by flooding the resins in the columns with brine solution. The exchange reactions involved are reversible, and flooding the resins with brine results in a reverse exchange, whereby the calcium, magnesium, etc. in the cation exchange column are replaced by fresh sodium ions, and the carbonate, sulfate, etc. in the anion-exchange column are replaced by new chloride ions. The used brine solution containing the impurity ions originally extracted from the water treated, may then be exhausted to waste.

Although the above description has referred to systems in which the cation-exchange resin and the anion-exchange resin are contained in separate columns, it is also common practice to pack both resins into a single column, either in separate zones or as a uniform mixture of resins, and the invention is equally applicable to systems of the single-column type.

It is necessary to control, in some fashion, the point at which the regeneration cycle is activated. The simplest way is to sample the softened water periodically, analyze it for a measurable characteristic related to the effectiveness of the softening action (such as pH, conductivity, or calcium concentration, for example) and initiate the regeneration cycle when the measured characteristic indicates that the ion-exchange capacity of the beds is exhausted, or approaching exhaustion. This method is unsatisfactory in practice for most applications, because it requires regular attention on the part of the operator and consumes time in the making of the necessary measurements. Except for special applications where water is used in small volume or only intermittently, this method is therefore prohibitively expensive.

Other water softening systems have been so designed that the regeneration cycle is initiated automatically after a specified time period, or after the treatment of a predetermined volume of water. These, too, have proven less than satisfactory in practice. The systems which initiate the regeneration after a predetermined time fail to compensate for fluctuations in water demand which may place a larger or smaller load on the ion-exchange capacity of the resins in a given time period. Those which initiate the regeneration after a predetermined volume of water has been treated fail to compensate for fluctuations in the salt content of the input water. In either case there is a danger on the one hand of regenerating the resins before it is needed, which is wasteful of time, power and regenerant solution, or on the other hand of passing water through resins that are overdue for regeneration, resulting in complete softening of the water and contamination of the internal water system, e.g., boilers, heaters, by water scale forming elements.

Another and more recent approach to the problem of automatically initiating the regeneration at an appropriate time has been to embed electrodes constituting a conductivity cell, pH meter, or the like in one of the ion-exchange columns or to place them in the softened water effluent line so that they measure the characteristics of the water continuously, or on an automatically controlled periodic schedule, and to associate them with appropriate circuitry such as to automatically initiate the regenerating cycle when the measured characteristic of the effluent water passes a predetermined control value. Such systems have represented a very successful partial solution to the problem. However, they are in general dependent on the electrical measurement of very small changes in conductivity or other measurable characteristics of the ion-exchange material or of the effluent purified water. The equipment for making measurements of such small changes in characteristics is expensive in its simplest form and, unless made in more sophisticated forms that are even more costly and delicate, is subject to error caused by gradual changes in the characteristics of the electrodes, minor alterations of the electrolyte, fluctuations in line voltage, and the like.

The copending application of William Hodes and Edward Studley entitled WATER SOFTENING CONTROL Ser. No. 505,921 which was filed Nov. 1, 1965 and which is assigned to a common assignee with this application, discloses a sensing element useful in a control device for water softening apparatus. In accordance with the above copending application which is incorporated herein by reference, the control device has a sensing means comprising a contractile fiber of a copolymer of polyvinyl alcohol and polyacrylic acid which is sensitive to the concentration of calcium ions in a body of water surrounding the fiber, and control means responsive to the contractile fiber for controlling. The operation of the water softening apparatus in response to a predetermined change in the length of the contractile fiber. While such a contractile fiber, namely one consisting of a copolymer of polyvinyl alcohol and polyacrylic acid, has allowed for a most satisfactory water softening control apparatus, it is readily hydrolyzable and consequently has a brief useful lifetime. Hence, this fiber must be frequently replaced thereby resulting in higher costs.

In accordance with the present invention, there is provided a contractile fiber useful as a sensing element in a water softening apparatus as, for example, disclosed in the above copending application, which has a longer service life and greater strength thereby resulting in lower costs.

The sensing element of this invention which is useful in control apparatus for water softening and water de-ionization apparatus, consists of in combination at least one contractile fiber having a variable length responsive to the concentration of calcium ions in a body of water surrounding the fiber, and a pair of end fittings on the fiber adapted to immobilize one end of the fiber and to transmit to associated control apparatus changes in the position of the other end of the fiber, and the means of resetting the fibers to their original length and ionic state by regenerative ionic solutions.

Another especially desirable aspect of this invention contemplates a method of operating a water softening system, comprising in combination the steps of passing water to be softened through a mass of cation-exchange resin and a mass of anion-exchange resin, at an appropriate point subsequent to at least part of the passage through said cation-exchange resin immersing in the water a sensing element consisting of a contractile fiber having a variable length responsive to the concentration of calcium ions in said water, and regenerating the cation-exchange resin whenever the length of the fiber signals a calcium ion concentration in excess of a predetermined value. The means of regenerating the cation-exchange will also serve to regenerate the sensing element fibers to the original set size and ionic environment.

Broadly, in accordance with the present invention, there is provided in a water-treating apparatus comprising in combination cation-exchange means for removing divalent cations from water to be treated and substituting for the divalent cations, cations selected from the group consisting of hydrogen ions and sodium ions, anion-exchange means for removing divalent anions from the water and substituting for the anions, anions selected from the group consisting of hydroxyl ions and chloride ions, sensing means consisting of a contractile fiber having a length dependent on the concentration of calcium ions in the water and located in the apparatus in the flow stream of the water at a point downstream of at least a portion of the cation-exchange means, the sensing means being sensitive to the concentration of calcium ions in the water, means for regenerating the cation-exchange means and the anion-exchange means, and means responsive to the sensing means for activating the regenerating means in response to a predetermined level of calcium ion concentration in the water, the improvement in the water-treating apparatus comprising as the sensing means a water insoluble contractile fiber composed of polymers containing nonhydrolyzable groups, which groups are selected from the group consisting of carboxy, primary, secondary and tertiary amines and imine. There has been found in accordance with this invention that polymers containing groups which do not hydrolyze will have longer useful lifetimes, and $\alpha$-hydroxy or $\alpha$-halo carboxylic acids and maleic acid derivatives are examples of such compounds. These polymers are made in the form of partially crosslinked, insoluble but water-swellable fibers, which change in length on reaction with water hardness ions and which can be coupled to a switch to give an electrical signal on reaction with water hardness ions.

Figure 1:
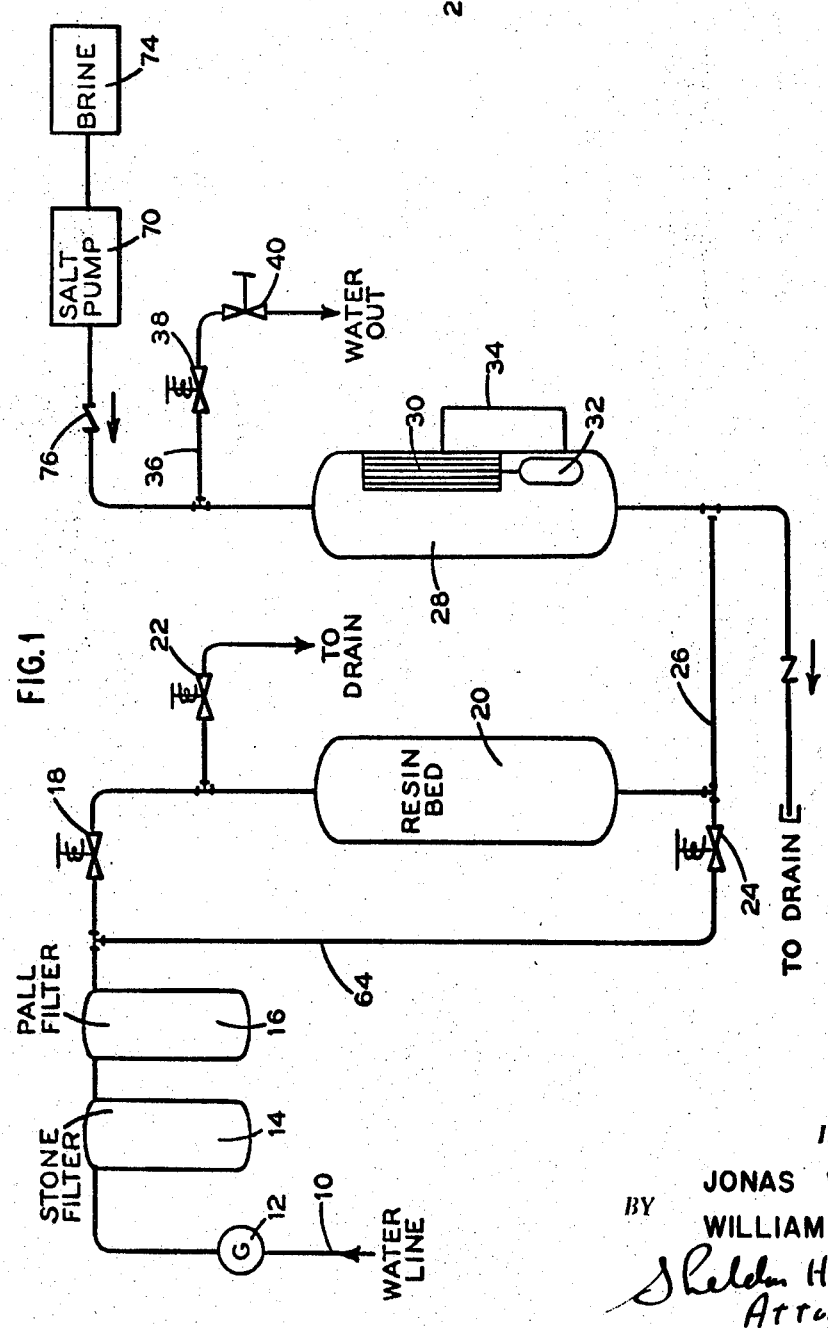
FIG. 1 is a diagrammatic representation of a water softening system in accordance with the present invention.

As illustrated in FIG. 1, the water softening system according to this invention comprises an input waterline 10, preferably provided with a pressure gauge 12 and one or more filters for removing solid matter, such as stone filter 14 and Pall filter 16. In the normal operation of the system for the softening of water, the water to be treated enters the system through waterline 10, through pressure gauge 12 and filters 14 and 16, and passes through normally open, solenoid-controlled valve 18, into ion-exchanger column 20. Solenoid-controlled valves 22 and 24 are closed during the water softening operation. On emerging from the ion-exchanger column 20, the softened water passes through line 26 to control chamber 28. In chamber 28, the treated water surrounds a sensing element comprising contractile fibers 30. A magnet 32 is suspended from contractile fibers 30, in such a way that the magnet is raised as the fibers contract. A reed switch or the like, contained in housing 34 is responsive to the position of magnet 32. Emerging from the top of control chamber 28, the treated water passes through line 36, normally open solenoid-controlled valve 38 and manual valve 40 to the point of use. A storage tank (not shown) may be interposed between solenoid-controlled valve 38 and manual valve 40 if desired, as will be obvious to those skilled in the art.

The water softening operation continues in the manner just described until the calcium ion concentration of the treated water reaches a predetermined value, which may be selected at will and adjusted by the relative positions of the contractile fibers and the magnet 32 attached thereto, and the elements in housing 34 which are responsive to the position of magnet 32.

When the calcium ion concentration reaches the predetermined value, the fibers 30 contract to an extent sufficient so that magnet 32 closes switch 42 (FIG. 2), contained in housing 34, which, through suitable electrical connections (not shown in FIGS. 1 and 2) initiates the regeneration cycle.

Figure 2:
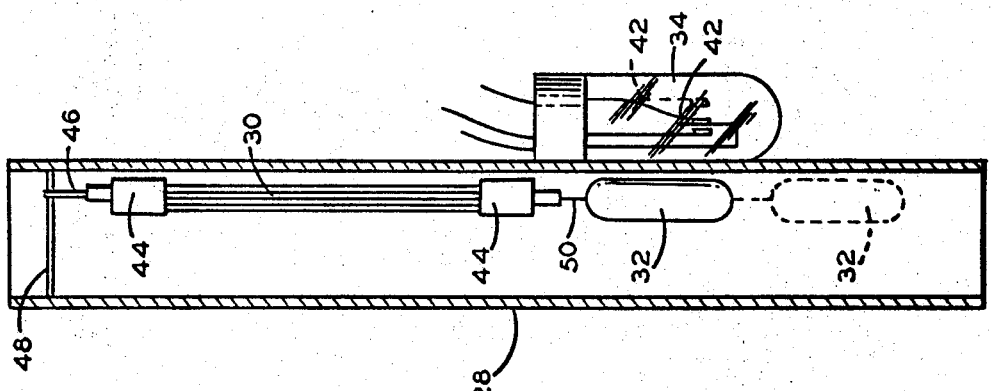
FIG. 2 is a somewhat diagrammatic representation of a control assembly according to the invention, including the novel sensing element of the invention.

FIG. 2 illustrates in greater detail the sensing element and the switch means contained in housing 34. As shown in FIG. 2, housing 34 contains a reed switch having a leaf 42 made of magnetic material, or carrying a separate piece of soft iron or the like (not shown), which is mounted in position such that when the fibers 30 are in their extended condition, the magnet 32 is in a position indicated by dotted lines where it is incapable of affecting leaf 42, so that switch leaf 42 remains open, as indicated in dotted lines. When fibers 30 contract in response to an increase in the calcium ion concentration of the surrounding water in chamber 28, the magnet 32 moves upwardly to the position shown in solid outline, in which it draws switch leaf 42 to the closed position indicated by solid lines in FIG. 2. The closing of the switch initiates the regeneration cycle, as more fully explained below with reference to FIG. 3. In order to enable the contraction of fibers 30 to bring about the required change in the position of magnet 32, the fibers are provided with appropriate end fittings 44 which are suitably connected to a suspension linkage 46 to a fixed member such as rod 48 at the upper end of the fibers, and a connecting link 50 at the lower end of the fibers, whereby magnet 32 is suspended.

As will be evident to those skilled in the art, many other arrangements may be used for the purpose of causing the switch or its equivalent to respond to a contraction of contractile fibers 30. To mention a few variations, the magnet may be mounted on switch leaf 42, a piece of soft iron or the like being suspended from the fibers in place of magnet 32. In place of a magnetically operated switch, a mechanically operated microswitch may be used, or a capacitance-sensitive device responsive to the position of a piece of iron or the like suspended from the fibers, or a linear transducer responsive to a contractile force exerted by the fibers, etc.

Figure 3:
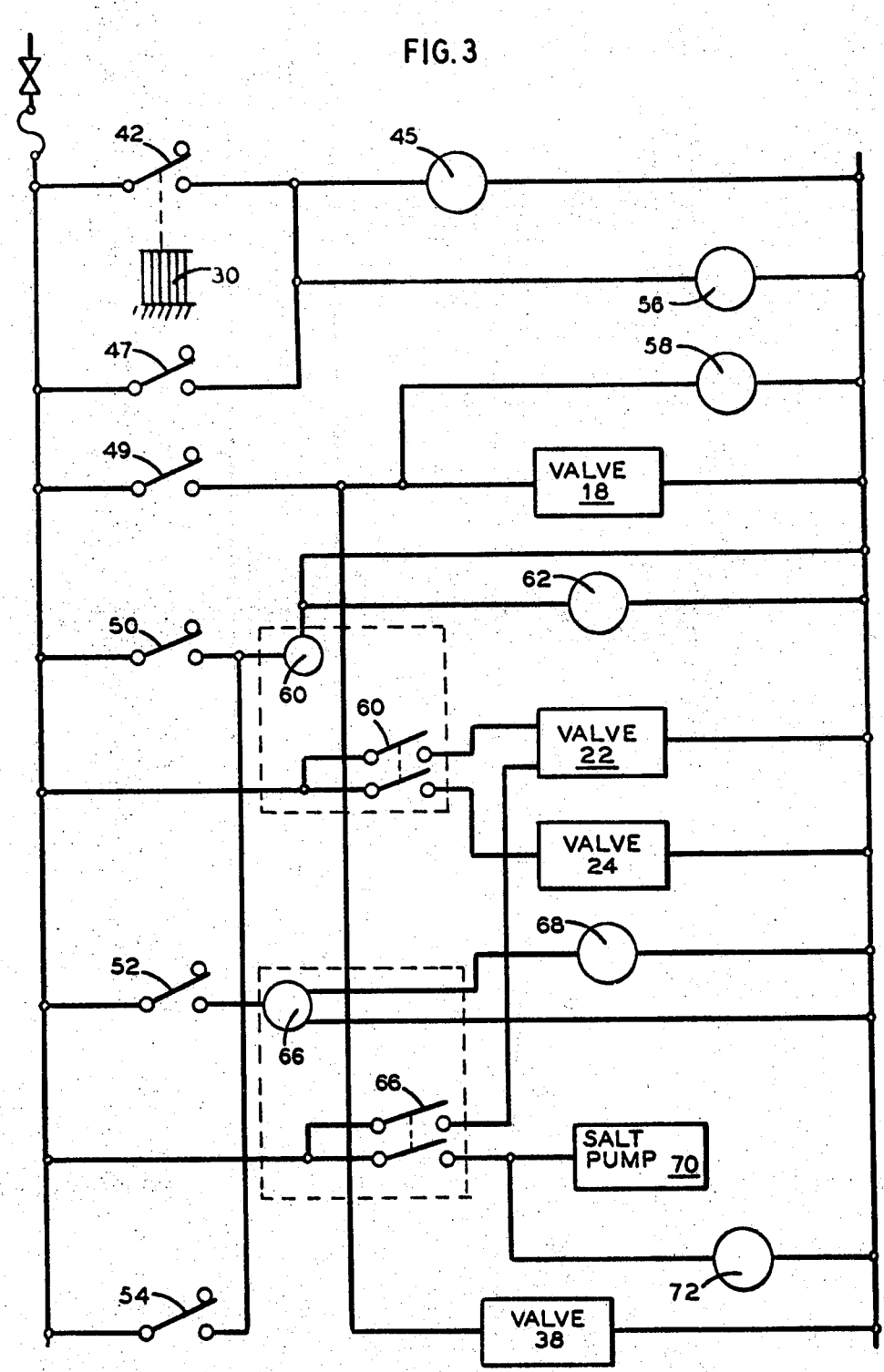
FIG. 3 is a schematic diagram of one form of electrical circuitry that may be used in conjunction with the apparatus of FIGS. 1 and 2 to carry out an automatically controlled regeneration cycle.

The regeneration cycle may be carried out in various ways, and controlled by various circuit arrangements, as will be obvious to those skilled in the art. One such circuit arrangement is illustrated in FIG. 3. In the operation of the regeneration cycle by the control apparatus as illustrated in FIG. 3, the regeneration cycle is initiated by the contraction of fibers 30 closing switch 42. Switch 42 energizes timer motor 45. Timer motor 45, preferably a synchronous motor or the like, is constructed either directly or through suitable reduction gearing, to rotate at a suitable speed (for example 1 revolution in 30 minutes), a shaft (not shown) bearing five cams (also not shown), shaped and positioned to open and close cam-follower switches 47, 49, 50, 52 and 54, in appropriately timed sequence to carry out the regeneration cycle about to be described.

The closing of switch 42 also energizes pilot light 56. Immediately on the energization of timer motor 42 a first cam closes switch 47 and holds it in closed position until the completion of the remainder of the regeneration cycle, so that pilot light 56 indicates that the regeneration cycle is in progress.

After a small time interval, for example one minute, a second cam closes switch 49 which in turn activates the solenoids (not shown) of solenoid-controlled, normally open valves 18 and 38, closing these valves. This cuts off all flow of water through the apparatus, as will be obvious on inspection of FIG. 1, as valves 18 and 24 are both closed. Switch 49 also energizes pilot light 58.

After a further short interval (e.g. 2 minutes) a third cam closes switch 50. The closing of switch 50 energizes relay 60 which, in turn, energizes pilot light 62, and the solenoids (not shown) associated with normally closed solenoid-controlled valves 22 and 24. Raw water now flows (see FIG. 1) from the feedline 10 through filters 14 and 16 and line 64, thence through valve 24 and upwardly (in opposition to the normal flow direction) through ion-exchange column 20, washing out solid deposits, and finally through valve 22 to waste. This backwash is continued for an appropriate period of time, for example about 5—10 minutes.

At the end of the backwash period, the third cam opens switch 50, thus deenergizing relay 60, which deenergizes pilot light 62, and allows normally closed valves 22 and 24 to close.

Next, a fourth cam closes switch 62, which energizes relay 66. Relay 66, in turn, activates pilot light 68, signaling that the brine-regeneration step is in progress, and also activates salt pump 70 and pilot light 72, which indicates that the salt pump is in operation, and reopens valve 22. During this phase of the operation, the salt pump circulates brine from brine tank 74 through check valve 76, downwardly through control chamber 28, through line 26, upwardly through ion-exchange column 20 and through valve 22 to waste. Brine is pumped through in this fashion for a suitable period, for example 5 minutes, and then the fourth cam opens switch 52, closing valve 6 and deactivating salt pump 70. The brine solution in ion-exchange column 20 and control chamber 28 is allowed to stand under static conditions for a suitable time period, say 4 minutes. Then the third cam, operating through switch 50 and relay 60, reopens valves 22 and 24 allowing raw water to flow through line 64, valve 24, column 20 and valve 22 to the drain, thus flushing the ion-exchange column 20 free of brine. The flushing operation continues for a suitable time, say 4 minutes, after which the third cam recloses switch 50, deenergizing relay 60 and allowing valves 22 and 24 to close.

Finally, the second cam reopens switch 48, allowing normally open valves 18 and 38 to reopen, restoring normal operation. At the same time, the first cam reopens switch 46, thereby deenergizing timer motor 44 and pilot light 56 and thus indicating the end of the regeneration cycle.

Figure 4:
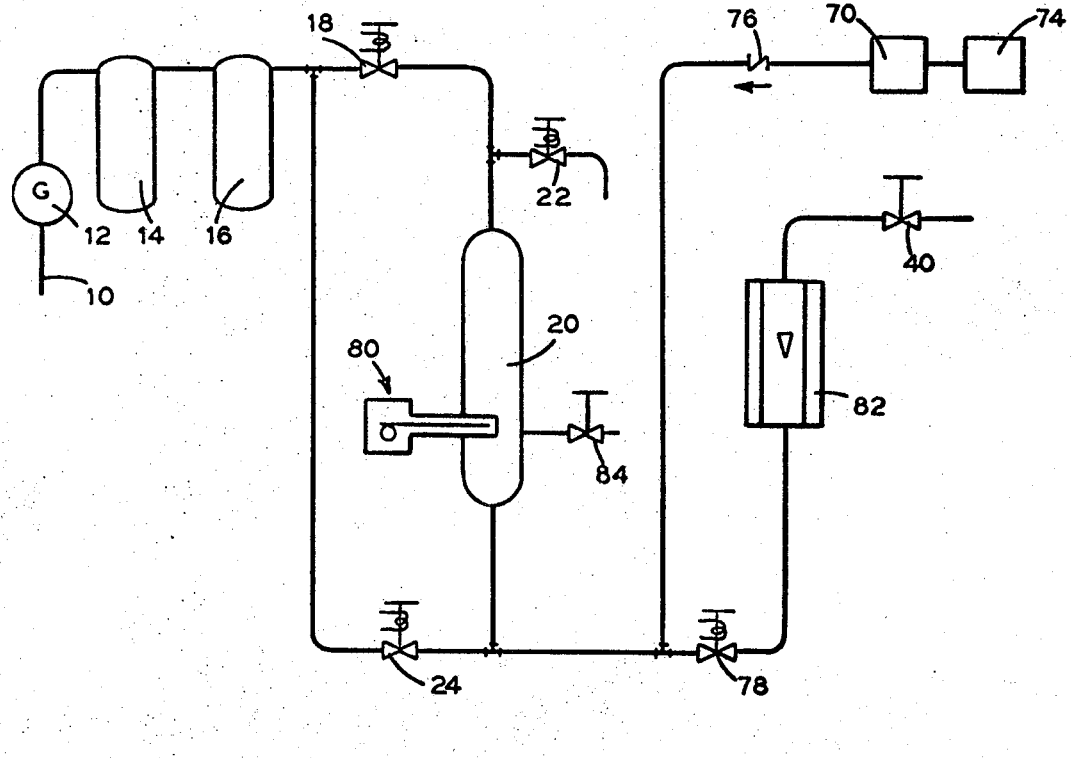
FIG. 4 is a diagrammatic representation of another form of water softening system according to the invention, having a sensing device embedded in the ion-exchange material.

FIG. 4 illustrates a modified form of water softening apparatus according to the invention, using a sensing element which is embedded in the ion-exchange resin. Using this form of the invention, the regeneration cycle can be automatically initiated when the bed is approaching exhaustion, before there is any appreciable change in the characteristics of the treated water.

In the operation of the apparatus as illustrated in FIG. 4, hard water to be treated enters through line 10 which is preferably provided with pressure gauge 12, and passes through filters 14 and 16. In normal operation, solenoid valves 18 and 78 are open, and the water flows downwardly through ion-exchange column 20, passing the control element indicated generally at 80, through normally open valve 78, upwardly through flowmeter 82 (optional), and through flow control valve 40 to storage or use.

As the softening action continues, the exchange capacity of the resin in column 20 is gradually depleted, first at the top of the bed and then progressively downward. The control element 80 is located preferably in the lower portion of the column. As the moving front of depleted resin capacity reaches the point at which the sensing element of the control is located, the calcium ion concentration of the water in this portion of the bed increases signaling that the bed is approaching exhaustion, and initiating the regeneration cycle.

For the regeneration cycle, valves 22 and 24 are first opened and valve 18 and 78 closed, backwashing the ion bed with raw water to remove solid deposits. Then valve 24 is closed and brine is pumped from brine tank 74 by brine pump 70 through check valve 76, upwardly through ion-exchange column 20 through valve 22 to waste. Finally, the residual brine is flushed out of the column by backwashing with raw water, using the same valve settings as for the initial backwash. If desired, the initial backwash may be omitted, as the circulation of brine and the subsequent backwash will adequately remove any foreign solid materials that may have been deposited in the bed. Valve 84 is not essential to the operation of the apparatus, but may be provided for sampling purposes.

Obviously, the regeneration cycle of the apparatus of FIG. 4 may be controlled by an automatic control arrangement similar to that of FIG. 3.

Figure 5:
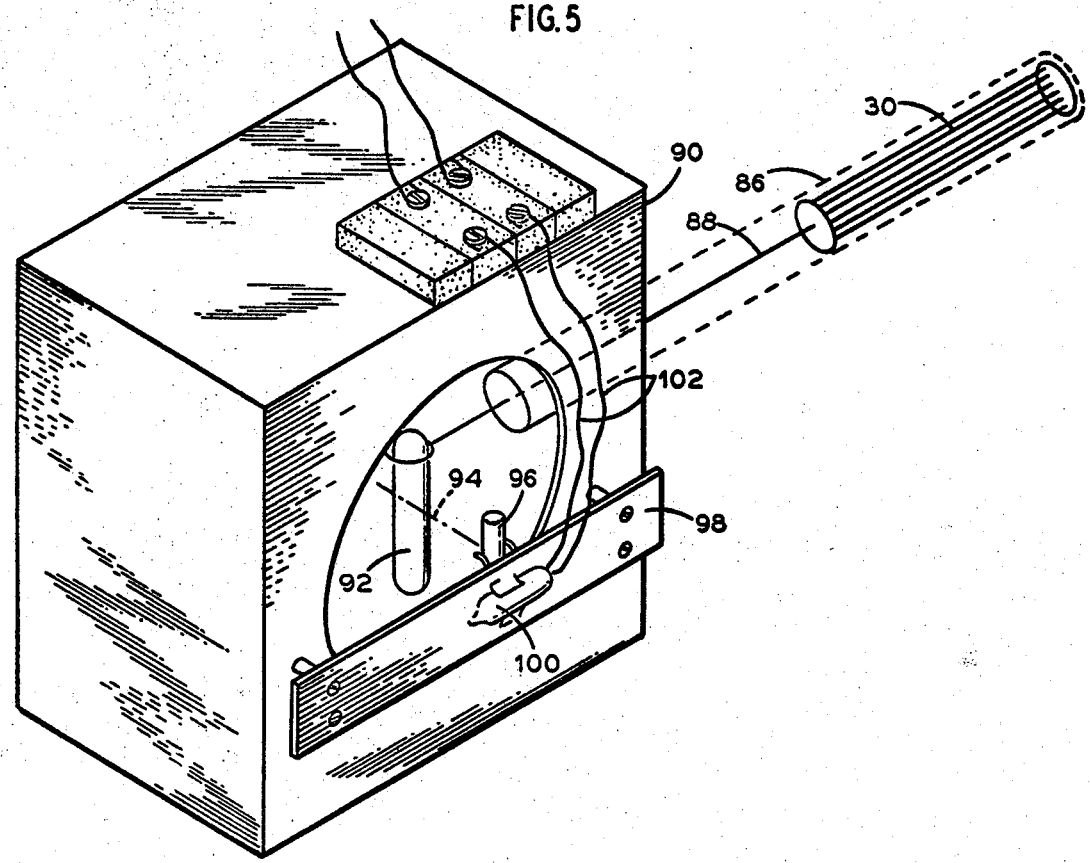
FIG. 5 is a somewhat diagrammatic perspective view, with certain parts cut away, of another form of control assembly according to the invention.
Figure 6:
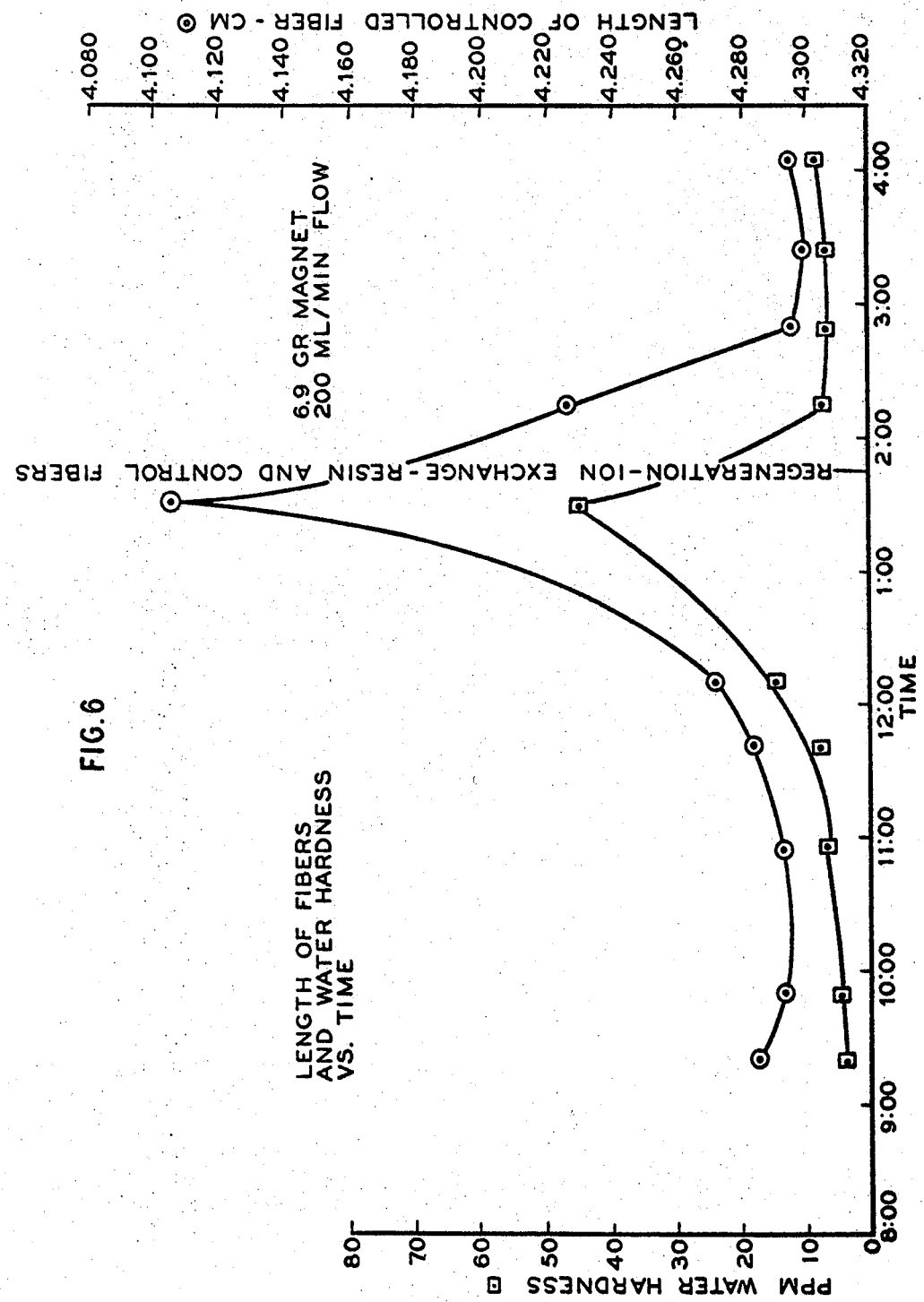
FIG. 6 is a graphical illustration of the manner in which the contractile fiber of the invention changes in length in response to changes in calcium ion concentration in the surrounding water.

FIG. 5 illustrates, somewhat diagrammatically, a suitable type of control assembly for use with the apparatus as shown in FIG. 4. As shown in FIG. 5, the control assembly comprises an array of contractile fibers 30 mounted in a tubular housing 86, shown in phantom, adapted to be inserted through a suitable aperture in the side of an ion-exchange column (not shown in this view). Housing 86 is not watertight, but is perforated in the vicinity of fibers 30 to allow the water in the column to flow around the fibers. One end of the bundle of contractile fibers 30 is connected to the inside end of housing 86. The other end of the fiber bundle is connected to a cord or wire 88 which extends to the interior of housing 90, which is located outside the wall of the column.

Within housing 90, the wire or cord 88 is connected to one end of a bar magnet 92, which is mounted for limited rotation about a pivotal axis 94. Suitable means (not shown), are provided for biasing magnet 92 to resist rotation in the direction produced by tension on cord or wire 88. Such means may be, for example, a coil spring, a weight attached to the magnet, or simply the gravitational bias which may be generated by locating the pivot at a point other than the center of gravity of the magnet.

Outside the housing is a second bar magnet 96, which is pivotally mounted in a suitable fixed member 98, in such a position that it tends to rotate in response to rotational movements of magnet 92, keeping itself in alignment therewith. Magnet 96 may be, for example, mounted on a shaft (not visible) journaled in fixed member 98.

On the other end of such a shaft, or otherwise fixed to magnet 96, is a mercury tilt-switch 100, connected by suitable electrical leads 102 to the regeneration cycling circuit (not shown in this view).

In operation of the control assembly as shown in FIG. 5, the mercury switch is normally open. When the calcium ion concentration of the water surrounding contractile fibers 30 increases above a predetermined value, fibers 30 contract, exerting a tension on cord or wire 88 which, in turn, causes a partial rotation of magnet 92 about axis 94. Magnet 96 follows the rotation of magnet 92, causing, in turn, a partial rotation of tilt-switch 100, closing it and energizing the regeneration circuit. By the time the regeneration is complete, the contractile fibers 30 have relaxed sufficiently to return magnet 90, magnet 96, and tilt-switch 100 to their normal positions, thus resetting the control for the next cycle of operation.

From the foregoing description, it will be apparent that the water softening system and the control assembly of this invention may be used with any sensing element embodying a contractile fiber which contracts appreciably in the presence of calcium ions. Calcium is not the only water-hardening ion that must be removed by the water softening system. Other cations, such as magnesium, strontium, aluminum and the like, and anions such as carbonate and sulfate ions must also be removed, and it is theoretically possible to have a water effluent which is undesirably hard, without containing an excess of calcium ions. In virtually all practical applications, however, calcium is the most abundant and troublesome of the hardening ions present, and can safely be used as an index of the total hardness of the water.

As stated earlier, effective fibers for use in the sensing element according to the invention are polymers containing carboxy groups or primary, secondary or tertiary amine or imine groups. Such a fiber may be produced for example, by spinning or extruding into a coagulating bath a mixture of polyvinyl alcohol and polymaleic acid solutions, or a solution of copoly (vinyl alcohol-maleic acid).

Many other polyelectrolytes which contain carboxy and amine radicals sensitively react to the presence of alkaline earth ions, such as calcium and magnesium. Often water soluble polyelectrolytes form exceedingly weak or brittle structures when coagulated from solution and subsequently dried. In order to translate changes in polymer configuration into macroscopic dimensional changes polyelectrolytes are reinforced by the coagulation together with other polymers and made insoluble by intermolecular cross-linking.

Products with increased tensile and rupture strengths are obtained by codissolving polyelectrolytes such as polyacrylic acid, polymaleic acid with hydroxyl bearing polymers such as polyvinyl alcohol, hydroxyethyl cellulose, carboxymethyl cellulose, polypropylene oxide, hydroxylated rubbers, and partially esterfied cellulose acetate. The polymer mixes are cast as film, or spun as fibers by coagulating in nonsolvents. Heating at 80°—120° C. for 10 minutes to 3 hours serves to stabilize the interpolymer structure by cross-linking. The extent of cross-linking and thus the extent of subsequent dimensional changes in water media can be controlled by the length of time the polymers are exposed to temperatures in this range.

Copolymerization of the electrolytes containing monomers, viz, maleic anhydride, acrylic acid, or methacrylic acid, etc. with vinyl acetate, styrene, vinyl methyl ether, acrylamide, acrylonitrile, vinyl chloride, ethyl acrylate, etc., can provide hardness sensitive materials. Coprecipitation with hydroxy polymers, such as polyvinyl alcohol, provides the necessary strength characteristics. The incorporation of 0.2 percent to 5 percent polyfunctional cross-linking agents, such as divinyl benzene, ethylene glycol dimethacrylate, hexamethylol melamine, etc. serve to stabilize the copolymer product fibers.

The coagulating bath may be, for example, a mixture of sodium sulfate and zinc sulfate in aqueous solution.

The process conditions for making such fibers may vary widely, as will be readily apparent to those skilled in the art of spinning synthetic fibers. The following example, therefore is presented purely by way of illustration, and is not to be construed as defining the only conditions contemplated as being within the scope of the invention.

EXAMPLE I

About 9.36 g. of copolymer of methyl vinyl ether and maleic anhydride was dissolved in 150 ml. dimethyl formamide and 12.2 g. of iodine was added to give a brown solution. 1.8 g. of sodium borohydride in 50 ml. of dimethyl formamide was then added to give a pale yellow solution. The solution was allowed to stand for 1 hour and 20 ml. of water was added. After this solution was allowed to stand overnight, a clear, viscous, slightly yellow solution resulted. This solution was added in small portions to 300 ml. of distilled water whereupon a pink precipitate formed. The precipitate was removed as it formed and then dried by evacuation at 10 microns of mercury. Fibers were made by dissolving the copolymer and polyvinyl alcohol (weight ration of 1:9.45) in water to make a solution containing 5 weight percent of solids and by extruding the solution into a coagulating bath (saturated sodium sulfate plus 2 weight percent zinc sulfate at 40° C.). The fibers were air dried and cross-linked by heating at 105° C. for 20 minutes. The salt was then washed off and the fibers soaked in dilute hydrochloric acid and then dilute sodium hydroxide before use. The resulting fibers were tough and elastic and showed length changes up to 17 percent on treatment with 100 p.p.m. of calcium chloride.

EXAMPLE II

Polymaleic anhydride having a molecular weight of about 300,000, was dissolved in a warm aqueous solution of polyvinyl alcohol to give a solution which was 10 weight percent in each component. It was extruded as in Example I, cross-linked by heating 10 minutes at 100° C., washed, and treated with dilute hydrochloric acid and then dilute sodium hydroxide. The resulting fiber were tough and elastic and showed length changes up to 17 percent on treatment with 100 p.p.m. of calcium chloride.

EXAMPLE III

Cotton fibers (twist), gauze, and threads were dipped into free radical initiator solution, 0.1 M $Ce(NH_4)_2NO_6$ in $1NHNO_3$, and then into a liquid monomer acrylonitrile. After 15 minutes at room temperature sufficient copolymer grafts of polyacrylonitrile were formed on the cellulose. The fibers were subjected to 4 percent NaOH solution for 15 minutes at 80° C. and acidified to convert to the swollen gel fibers of cellulose-polyacrylic acid, graft copolymers with retention of the original fiber forms. These modified fibers showed reverse extension properties; that is, shrinkage of the swollen Na form in $H_2O$ and expansion of the Ca form in 100 p.p.m. calcium chloride repeatedly through several test cycles. This is due to the twist formations of the substrate.

EXAMPLE IV

Rayon monofilaments were treated as in Example III to impart contractile properties to them. They shrank in the presence of calcium and magnesium ions and could be regenerated to full length by treatment with brine and then with soft water.

While this invention has been described with reference to certain preferred embodiments and illustrated by way of certain drawings and examples, these are illustrative only, as many alternatives and equivalents will readily occur to those skilled in the art, without departing from the spirit or proper scope of the invention.

We claim:

1. In a water treating apparatus comprising in combination cation-exchange means for removing divalent cations from water to be treated and substituting for said divalent cations, cations selected from the group consisting of hydrogen ions and sodium ions, anion-exchange means for removing divalent anions from said water and substituting for said anions, anions selected from the group consisting of hydroxyl ions and chloride ions, sensing means consisting of a contractile fiber having a length dependent on the concentration of calcium ions in the water and located in said apparatus in the flow stream of said water at a point downstream of at least a portion of said cation-exchange means, said sensing means being sensitive to the concentration of calcium ions in said water, means for regenerating said cation-exchange means and said anion-exchange means, and means responsive to said sensing means for activating said regenerating means in response to a predetermined level of calcium ion concentration in said water, the improvement in said water-treating apparatus comprising as the sensing means a water insoluble contractile fiber composed of polymers containing nonhydrolyzable groups selected from the group consisting of a mixture of polyvinyl alcohol and polymaleic acid solutions, or a solution of copoly (vinyl alcohol-maleic acid).

2. A water-treating apparatus according to claim 1, wherein said cation-exchange means is effective to substitute hydrogen ions for divalent cations contained in said water, said anion-exchange is effective to substitute hydroxyl ions for divalent anions contained in said water, and said means for regenerating said exchange means is effective to circulate an aqueous solution of mineral acid through said cation-exchange means and an aqueous solution of a mineral alkali through said anion-exchange means.

3. A water-treating apparatus according to claim 1, wherein said cation-exchange means is effective to substitute sodium ions for divalent cations contained in said water, said anion-exchange means is effective to substitute chloride ions for divalent anions contained in said water, and said means for regenerating said exchange means is effective to circulate an aqueous solution of sodium chloride through said cation-exchange means and said anion-exchange means.

4. Apparatus according to claim 3 wherein said means for activating said regenerating means comprises a switch actuated in response to a change in the length of said contractile fiber.